United States Patent [19]

Sullivan et al.

[11] Patent Number: 5,365,491
[45] Date of Patent: Nov. 15, 1994

[54] MARINE SEISMIC BOTTOM GEOPHONE COUPLING AND ANCHOR

[75] Inventors: Lawrence B. Sullivan, Plano, Tex.; Jeffrey H. Hastings, Anchorage, Ak.

[73] Assignee: Atlantic Richfield Company, Los Angeles, Calif.

[21] Appl. No.: 169,288

[22] Filed: Dec. 20, 1993

[51] Int. Cl.$^5$ ............................................. G01V 1/38
[52] U.S. Cl. ..................................... 367/15; 367/16; 367/20; 367/154; 367/188; 181/401; 181/402
[58] Field of Search .................. 367/14, 15, 16, 20, 367/154, 188; 181/401, 402, 110

[56] References Cited

U.S. PATENT DOCUMENTS

| | | | |
|---|---|---|---|
| 2,590,531 | 3/1952 | McLoad | 367/154 |
| 4,636,998 | 1/1987 | Greene et al. | 367/154 |
| 4,870,625 | 9/1989 | Young | 367/16 |

*Primary Examiner*—J. Woodrow Eldred
*Attorney, Agent, or Firm*—Albert C. Metrailer

[57] ABSTRACT

A marine seismic bottom geophone anchor and coupling device comprising two rectangular fabric sections attached along their edges and along a plurality of lines between edges to form a plurality of pockets. The pockets are filled with a weighting material. Connecting means are provided so that when the combined fabric sections are wrapped around a marine seismic bottom geophone, it will be held in a generally cylindrical form to simultaneously anchor the geophones and associated cables at a desired marine bottom location, isolate the sensors from noise sources, and provide good coupling to the marine bottom for receiving desired seismic signals.

13 Claims, 2 Drawing Sheets

MARINE SEISMIC BOTTOM GEOPHONE COUPLING AND ANCHOR

BACKGROUND OF THE INVENTION

The present invention relates to apparatus and methods for anchoring marine seismic bottom geophones and associated cables at desired locations while shielding the geophones from ambient currents and providing good seismic coupling to the marine bottom surface.

As the search for oil and gas reserves has extended into more remote portions of the world, more hostile conditions have been encountered which interfere with conventional exploration techniques. The Cook Inlet area of Alaska is a good example of one of these areas. In portions of this area, the water is deep enough so that conventional marine exploration techniques can be used. However, in many areas, the water is too shallow for such conventional open water techniques. While shallow water techniques have been developed and used successfully in other portions of the world, the bottom surface conditions and high currents have interfered with their use in the Cook Inlet. The marine bottom in this area is generally hard, smooth rock surface with essentially nothing to anchor to. Daily tidal height changes can be in excess of 30 feet with resultant peak tidal currents of over 6 knots. A conventional shallow water exploration method requires the use of marine seismic cables positioned on the water bottom and in contact with the bottom surface for receiving seismic signals. However, the high current conditions tend to move the seismic detectors from their desired locations and also cause significant noise generation by movement of the geophones and the cables to which they are connected. The hard, smooth surface of the bottom makes ineffective any typical anchoring mechanism.

SUMMARY OF THE INVENTION

In accordance with the present invention, there is provided a marine seismic bottom geophone coupling and anchor, comprising essentially two rectangular fabric sections attached together along their edges and along a plurality of lines between said edges to form a plurality of pockets. Each pocket is filled with a weighting material. A connecting flap is attached to the outer surface of one of the two fabric sections along a first of two opposing edges and a corresponding connecting strip is attached to the outer surface of the second fabric section so that the fabric sections can be rolled and held in a generally cylindrical shape. When the device is rolled around and bound to a marine seismic bottom cable and seismic detector, it simultaneously acts as an anchor to hold the detector in the desired position on the marine bottom, provides good coupling to the marine bottom, and reduces or eliminates noise caused by detector and cable movement in response to ambient current conditions.

BRIEF DESCRIPTION OF THE DRAWINGS

The present invention may be better understood by reading the following detailed description of the preferred embodiments, with reference to the accompanying drawings, wherein.

DESCRIPTION OF THE PREFERRED EMBODIMENT

Figure 1:
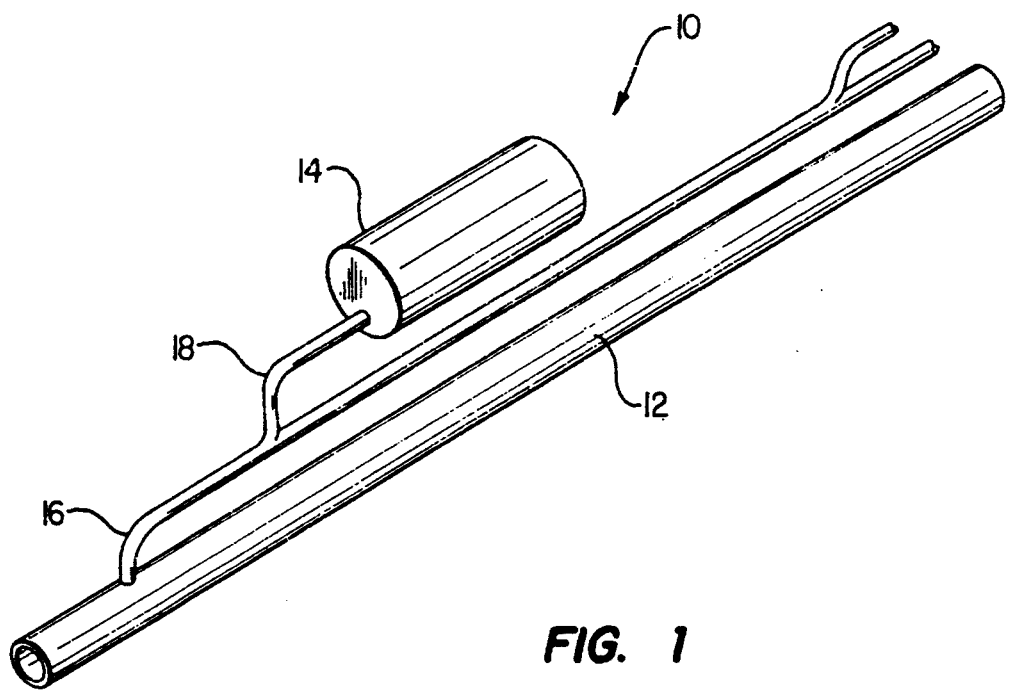
FIG. 1 is an illustration of a typical marine seismic bottom cable section, illustrating the arrangement of the main cable, a take-out cable, and a seismic detector.

With reference now to FIG. 1, there is illustrated a typical marine seismic bottom cable arrangement 10. A main cable 12 contains a number of conductors for coupling signals from seismic detectors such as geophone 14 to a data recording system. At various locations along main cable 12 are provided take-out cables 16. Take out cable 16 provides connections 18 through which geophones such as 14 and if desired, hydrophones, may be connected. A typical main cable 12 may have six take out cables 16. A typical take-out cable or sensor string 16 may have four sensors, typically two hydrophones and two geophones.

When the cable arrangements shown in FIG. 1 are used in low current conditions with sandy or muddy bottoms, the devices tend to sink to some extent into the bottom surface, providing both anchoring and good seismic coupling. However, the hard smooth bottom conditions encountered in areas such as the Cook Inlet provide neither good anchoring nor good coupling. Even if conventional sand bags are positioned on top of detector 14 or detector 14 is placed inside a simple sand bag, good anchoring and signal quality are difficult to obtain. The geophone device 14 typically has a hard outer surface, which tends to make point contacts with a hard, rocky surface and not provide good seismic coupling. Any movement of the geophone 14 under such conditions generates considerable seismic noise. If geophone 14 is placed inside a simple sand bag, repeated handling of the cable causes the geophone to displace from its central location within the sand mass, thus reducing both coupling effectiveness and current induced motion suppression.

Figure 2:
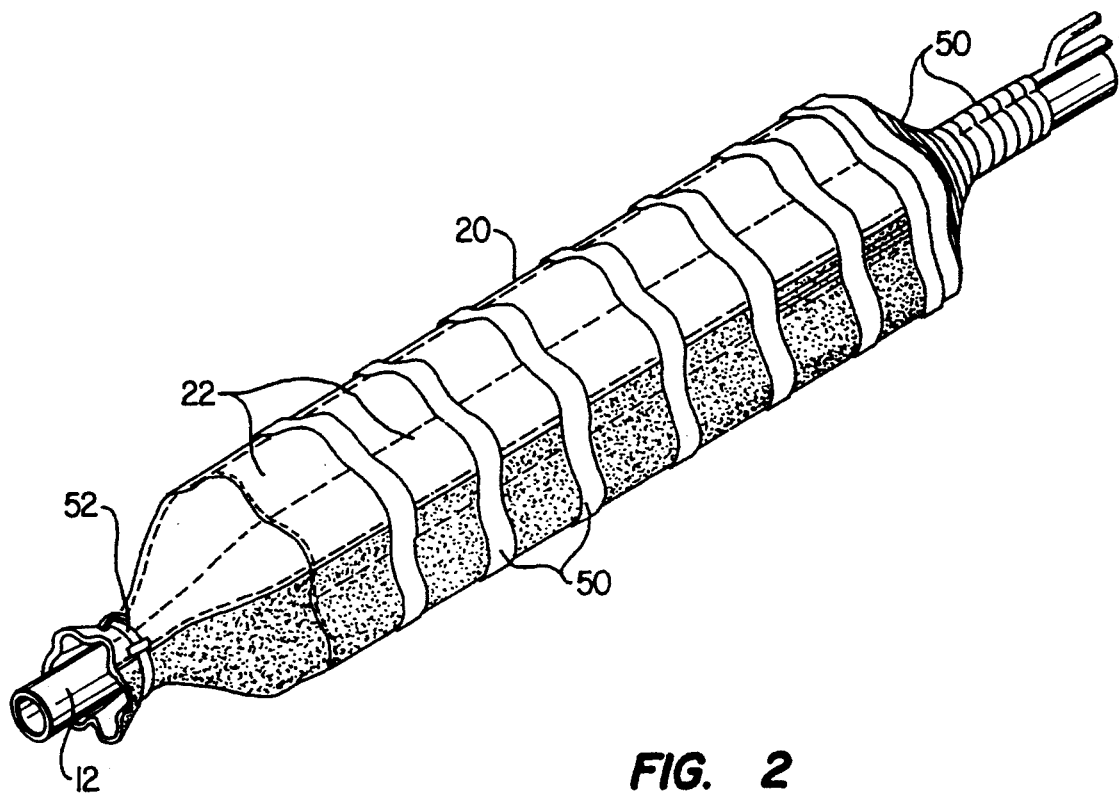
FIG. 2 is an illustration of the marine seismic bottom cable section of FIG. 1 with an anchoring and coupling device according to the present invention installed.

With reference to FIG. 2, there is illustrated the section of marine bottom cable 12 of FIG. 1 with a coupling and anchoring device 20 according to the present invention installed. In this installed condition, the device 20 comprises a plurality of tubular pockets 22 which are filled with a weighting material and wrapped around the cable 12, take-out 16, and geophone 14. The weighting material is preferably sand. By providing the sand filled pockets 22 on all sides of cable 12, the geophone 14 is simultaneously held in place by those pockets above the geophone and effectively coupled to any marine bottom surface by those pockets below the geophone. By including cables 12 and 16 within the anchor 20, current induced motions of the cables are minimized and isolated from the sensor 14.

Figure 3:
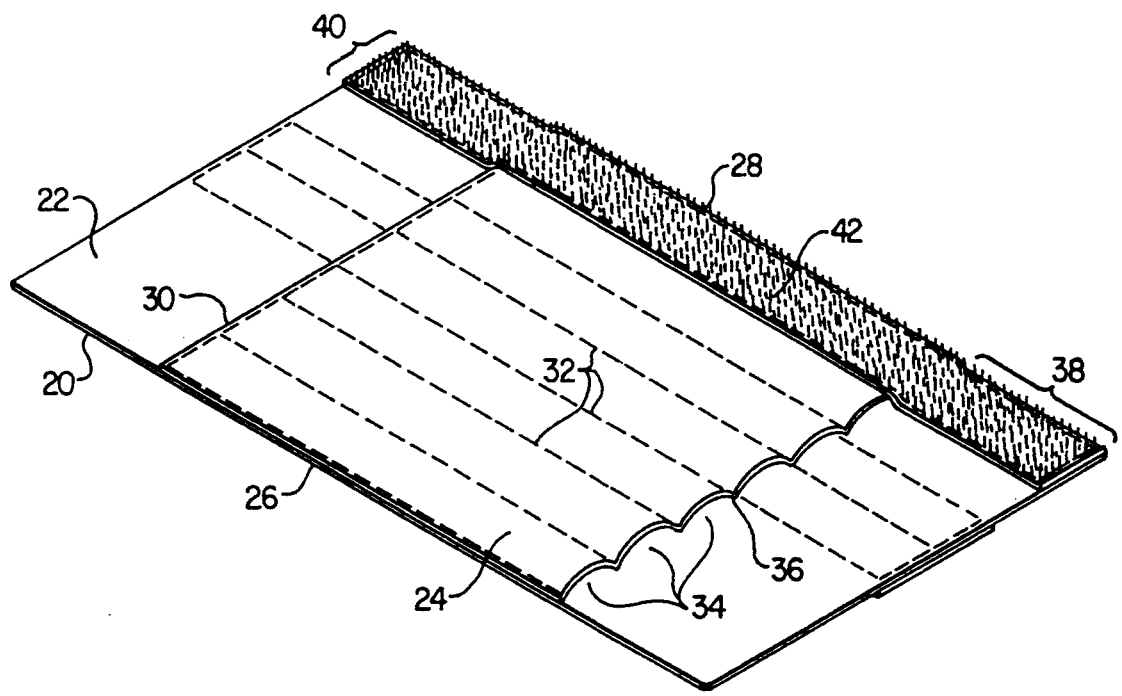
FIG. 3 is an illustration of the inner surface of the anchoring device of the present invention in its unfolded position.
Figure 4:
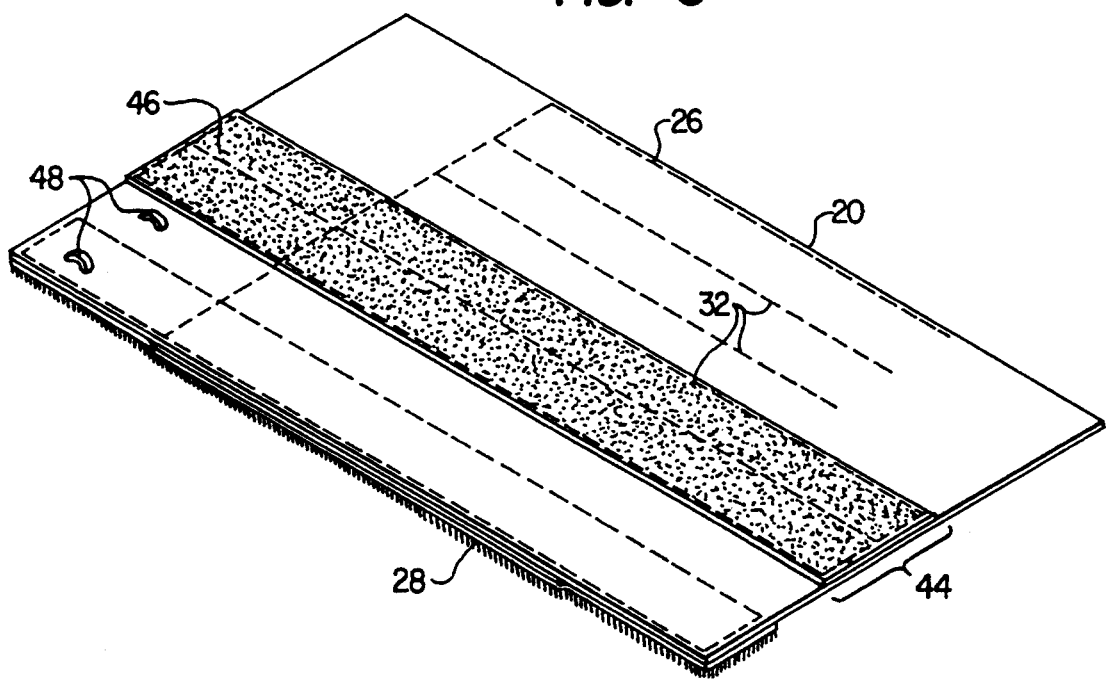
FIG. 4 is an illustration of the outer surface of an anchoring device according to the present invention in its unfolded condition.

With reference to FIGS. 3 and 4, a preferred construction of the anchor 20 is illustrated. FIG. 3 illustrates the inner surface, while FIG. 4 illustrates the outer surface relative to the configuration of the anchor 20 when used as illustrated in FIG. 2. The anchor 20 comprises primarily two rectangular fabric sections 22 and 24. The term "fabric" can include nylon sail cloth, or double webbed vinyl, which comprises two layers of vinyl laminated together with a nylon fabric. In FIG. 3, fabric sections 22 and 24 are attached, by sewing with thread, along at least three edges. This includes a first two opposing edges 26 and 28 along the longer axis of the rectangular fabric sections 22 and 24. The sections are also sewed together along one of the short edges 30. In addition, sections 22 and 24 are sewed together along a plurality of lines 32, which are intermediate and parallel to the longer edges 26 and 28. As a result, a number of tubular pockets 34 are formed between fabric sections 22 and 24. In use, these pockets 34 are filled with a weighting material, such as sand. If desired, sections 22 and 24 can also be sewed together along the fourth edge 36 after pockets 34 are filled. However, in the preferred embodiment, this edge is not sewed but is closed by folding over a portion 38 of the fabric section 22 to close the openings of pockets 34.

Also illustrated in FIG. 3 is a connecting flap 40 positioned along edge 28 on the inner surface of anchor 20. Flap 40 is covered with a strip of Velcro material 42. Material 42 is attached by the same stitching process which connects the basic fabric sections 22 and 24.

With reference to FIG. 4, the outer surface of anchor 20, in its unfolded state, is illustrated. The stitching along edges 26 and 28 and intermediate lines 32 is illustrated at the corresponding positions. There is also illustrated a connecting strip 44 for use in holding the anchor in its cylindrical position as illustrated in FIG. 2. Strip 44 comprises a layer of Velcro material 46 connected to the outer surface by the same stitching 32 which forms pockets 34. In the preferred embodiment, strip 44 is twice the width of connecting flap 40 on the inner surface of anchor 20. Strip 44 is illustrated at a location intermediate edges 26 and 28, but may be positioned at or near edge 26 if desired. The selection of this position determines the range of final cylindrical diameters available in use. The illustrated position allows the anchor 20 to be wrapped tightly about the bottom cable and geophone 14. The Velcro materials used for connecting flap 40 and connecting strip 44 are, of course, selected from the two types of material used in the Velcro connecting system so that when flap 40 if placed in contact with strip 44, a firm but releasable attachment is made.

Also illustrated in FIG. 4 is an optional pair of attachment loops 48 similar to belt loops. If desired, these can be placed along the ends of the outer surface as illustrated so that a rope or cord may be inserted and used to tightly bind the anchor 20 to the cable when it is installed. While such loops were used in early tests of the present invention, they have been omitted from the preferred embodiment as being unnecessary.

The first step in use of anchor 20 is to fill the pockets 34 with an aggregate material such as sand. In the preferred arrangement, the pockets 34 are not sewn shut, but instead, portion 38 of fabric section 22 is folded along edge 36 to cover the openings of pockets 34. The bottom cable 12, takeout cable 16 and geophone 14 are then positioned on the inner surface of anchor 20 and appropriately centered. Edge 26 is then folded over cables 12 and 16 and geophone 14. Edge 28 is then folded over edge 26 so as to make contact with connecting strip 44. Having completed these steps, the anchor is positioned in its cylindrical form about the cable 12 as illustrated in FIG. 2. To further tighten and bind the anchor 20 to the geophone 14, it is recommended that waterproof tape 50 be tightly wrapped around the outer surface of anchor 20. If belt loops 48 are used, a cord 52 may be inserted through the loops and tightly tied. Alternatively, additional strips of tape 50 may be wrapped around the end portions of anchor 20 and on to the cable 12 to eliminate any possibility of slipping along the cable, or any other form of movement.

When assembled, filled and installed as illustrated, the anchor 20 has been found to efficiently hold the bottom cable 12 in its desired location, while simultaneously minimizing current generated noises and providing very good coupling to hard, smooth marine bottom surfaces so that good seismic signals be collected. This anchor 20 will also be useful in providing good coupling and anchoring in other environments, even soft mud bottoms, where current induced noise degrades the collected data.

While the present invention has been illustrated and described in terms of specific apparatus and methods of use, it is apparent that various modifications can be made therein within the scope of the present invention as defined by the appended claims.

What is claimed is:

1. A marine bottom geophone coupling and anchor comprising:
    two rectangular fabric sections attached along their edges and at a plurality of lines between and parallel to one set of opposing sides to form a plurality of tubular pockets;
    an opening at one end of each tubular pocket and a flap for covering and sealing each opening;
    weighting material filling each tubular pocket;
    connecting flaps attached to a first two opposing edges of said fabric sections, and adapted for releasably attaching said opposing edges to hold said fabric sections in a generally cylindrical shape;
    loops attached to a second two of said opposing edges and a pair of cords inserted through said loops and adapted for releasably drawing said second opposing edges into engagement with a bottom cable passing through said anchor.

2. An anchor according to claim 1 wherein said fabric is selected from sailcloth and double webbed vinyl.

3. An anchor according to claim 1, wherein said weighting material comprises sand.

4. An anchor according to claim 1, wherein said connecting flaps include Velcro connectors.

5. A marine bottom geophone coupling anchor comprising:
    two rectangular fabric sections attached along their edges and along a plurality of lines between said edges to form a plurality of pockets;
    weighting material filling each pocket; and,
    connecting flaps attached to a first two opposing edges of said fabric sections, and adapted for releasably attaching said opposing edges to hold said fabric sections in a generally cylindrical shape.

6. A marine bottom geophone coupling anchor according to claim 5, further including:
    loops attached to a second two of said opposing edges and a pair of cords inserted through said loops and adapted for releasably drawing said second opposing edges into engagement with a bottom cable passing through said anchor.

7. An anchor according to claim 5 wherein said fabric is selected from sailcloth or double webbed vinyl.

8. An anchor according to claim 5, wherein said weighting material comprises sand.

9. An anchor according to claim 5, wherein said connecting flaps include Velcro connectors.

10. A marine bottom geophone coupling anchor comprising:
- two rectangular fabric sections attached along their edges and along a plurality of lines between said edges to form a plurality of pockets;
- weighting material filling each pocket; and,
- a connecting flap attached to of a first of two opposing edges of one of said fabric sections, and a connecting strip attached to the outer surface of the other of said fabric sections, said connecting flap and connecting strip positioned and adapted for releasably attaching said first opposing edge to said connecting strip so as to hold said fabric sections in a generally cylindrical shape.

11. An anchor according to claim 10 wherein said fabric is selected from sailcloth and double webbed vinyl.

12. An anchor according to claim 10, wherein said weighting material comprises sand.

13. An anchor according to claim 10, wherein said connecting flaps include Velcro connectors.

* * * * *